Feb. 20, 1968 R. VAN ZURK 3,370,231

TIME-AMPLITUDE CONVERTER

Filed Jan. 24, 1964 4 Sheets-Sheet 1

Feb. 20, 1968 R. VAN ZURK 3,370,231

TIME-AMPLITUDE CONVERTER

Filed Jan. 24, 1964 4 Sheets-Sheet 3

Feb. 20, 1968 R. VAN ZURK 3,370,231

TIME-AMPLITUDE CONVERTER

Filed Jan. 24, 1964 4 Sheets-Sheet 4

United States Patent Office 3,370,231

Patented Feb. 20, 1968

3,370,231

TIME-AMPLITUDE CONVERTER

Robert van Zurk, Meylan, France, assignor to Commissariat à l'Energie Atomique, Paris, France

Filed Jan. 24, 1964, Ser. No. 340,068

Claims priority, application France, Feb. 13, 1963, 924,644

3 Claims. (Cl. 324—68)

The present invention relates to time-amplitude converters which are intended for the measurement of time intervals as defined by an initial pulse and a final pulse and which are so designed that, each time two such pulses are applied thereto, said converters accordingly produce a third pulse having an amplitude which is proportional to the time interval to which said two pulses correspond.

A large number of time-amplitude converters of the type referred-to above have been produced up to the present time. However, the accurate determination of two instants which limit the time interval as measured from the initial and final pulses gives rise to serious difficulties, in particular when said pulses have a very rich amplitude spectrum. This is the case, for example, when it is required to perform spectrometric measurements by the transit-time method. The time-amplitude converters of conventional design have the disadvantage of being disturbed by stray pulses, the apparatus being rendered insensitive during such disturbances, thereby resulting in an increase in the "dead time."

In the time-amplitude converter which is described in the co-pending patent application No. 313,975 as filed by the present applicant on Oct. 3, 1963, in respect of "Time-Amplitude Converter," the initial and final pulses are respectively transmitted to the inputs of the converter unit by two coincidence circuits which are triggered by two threshold selectors. The disturbances which are brought about by the majority of stray pulses are accordingly eliminated. However, the apparatus can also be triggered accidentally by stray pulses having an amplitude which meets the conditions defined by the selectors.

The converter in accordance with the present invention is not subject to the drawback which has just been referred to, and is further characterized by its high precision and simple design. It applies the properties of tunnel diodes and makes use of semi-conductor devices such as transistors and diodes.

A time-amplitude converter in accordance with the invention which is intended for the measurement of time intervals as defined by an initial pulse and a final pulse and which is so designed that, each time such pulses are applied thereto, said converter accordingly produces a third pulse having an amplitude which is proportional to the time interval which is measured, is characterized in that two tunnel diodes, in which there is first established one of the stable states or so-called intermediate state corresponding to a positive differential resistance and which are triggered respectively by the initial pulse and final pulse, generate signals which are applied to the inputs of a controller at the output of which is developed a pulse having a duration which is equal to that of the time interval which is measured, said controller being followed by an integrator which produces a pulse having an amplitude which is proportional to said time interval.

In order to prevent the time-amplitude converter from being triggered accidentally, and in accordance with another characteristic feature of the invention, said converter comprises two ampitude discriminators to which are respectively transmitted the initial pulse and final pulse which are directed simultaneously towards the tunnel diodes, said discriminators generating signals which serve to restore the intermediate state in the tunnel diodes if the pulses have predetermined characteristics.

Those signals having predetermined characteristics which are generated by the amplitude discriminators when these latter receive initial pulses and final pulses having the characteristics already defined can trigger a coincidence circuit which serves to establish the intermediate state in the tunnel diodes.

In accordance with an essential characteristic feature of the invention, the discriminator towards which the initial pulses are directed produces a pulse having a duration which is equal to the longest time interval which the converter is capable of measuring, when said initial pulses received have satisfactory amplitude characteristics.

According to a preferred form of embodiment of the invention, the initial pulse and final pulse are delayed in an adjustable manner before being applied to the tunnel diodes. The result thereby achieved is that the tunnel diodes are reliably in the intermediate state when they receive the pulses which define the time interval to be measured.

An important advantage of the time-amplitude converter in accordance with the invention is that it cannot be disturbed by pulses which are transmitted to one of the discriminators alone. Neither can the converter be disturbed by two pulses respectively transmitted to both discriminators if these latter do not satisfy very special conditions both of amplitude and of time. Under these conditions, the disturbances caused by stray pulses are practically eliminated.

Apart from these main arrangements, the invention is also concerned with certain secondary arrangements which will be mentioned hereinafter and which relate especially to the operation of the discriminators as well as the design of the controller.

Reference being made to the accompanying figures, the description which follows below relates to one example of embodiment of the time-amplitude converter in accordance with the invention which is not given in any sense by way of limitation either insofar as concerns the modes of practical execution of the invention or insofar as concerns the purposes to which the invention can be applied.

Figure 2:
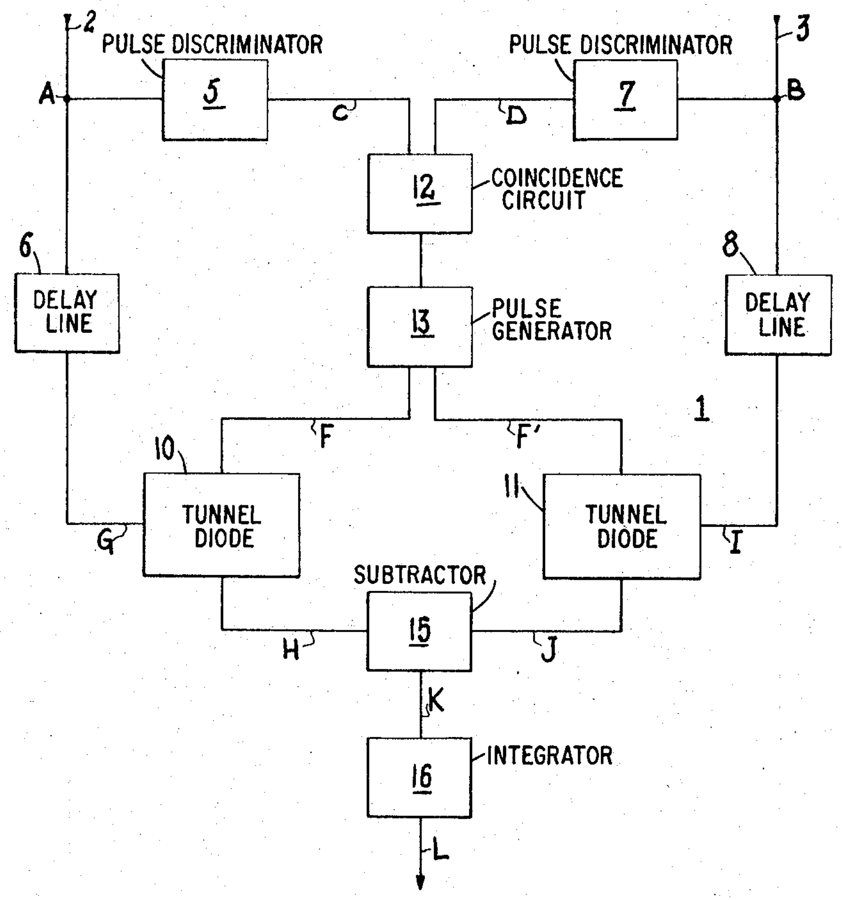
FIG. 2 is a general arrangement diagram of a time-amplitude converter in accordance with the invention.
Figure 3:
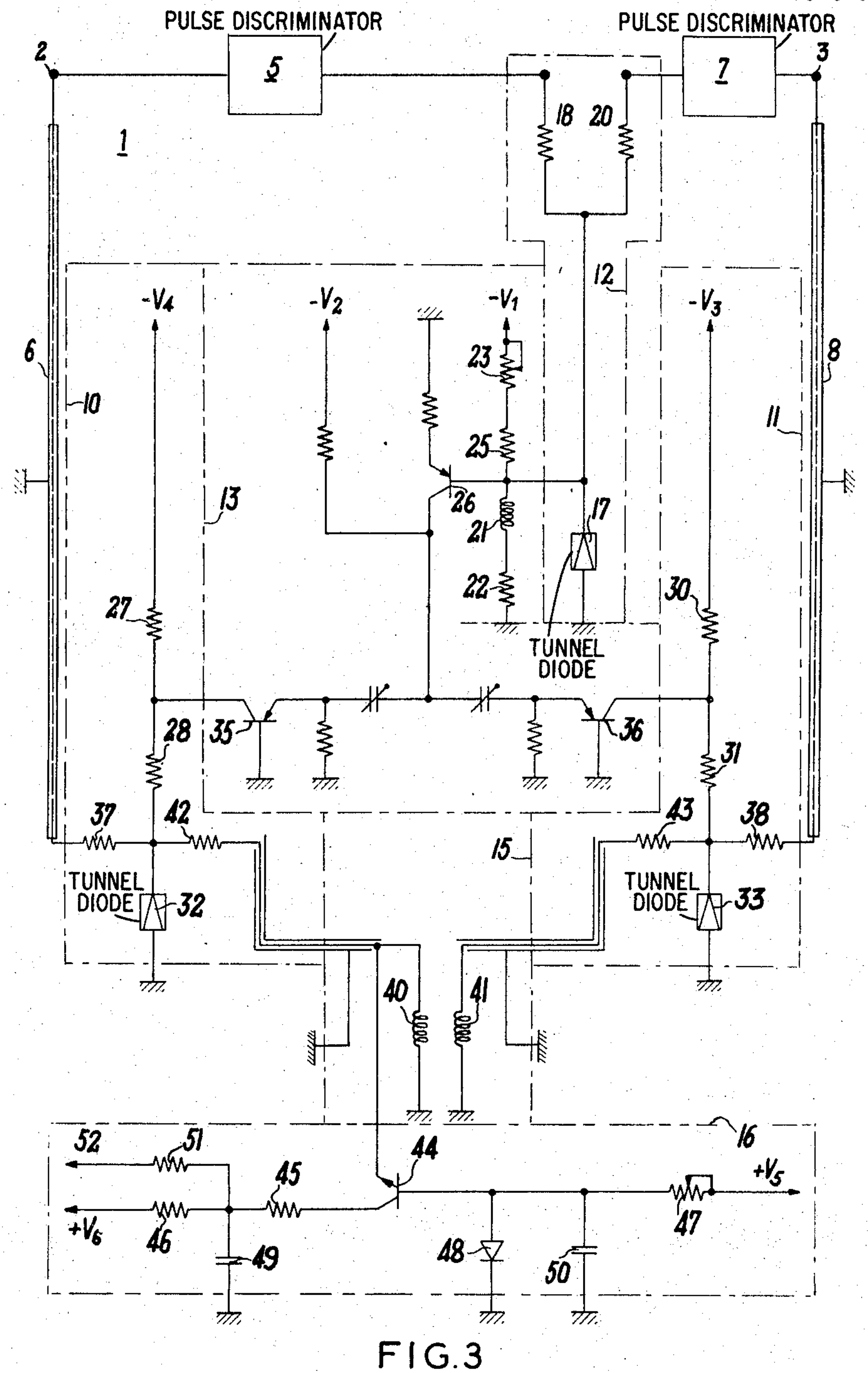
FIG. 3 is a circuit diagram of a time-amplitude converter as designed by the present applicant.
Figure 4:
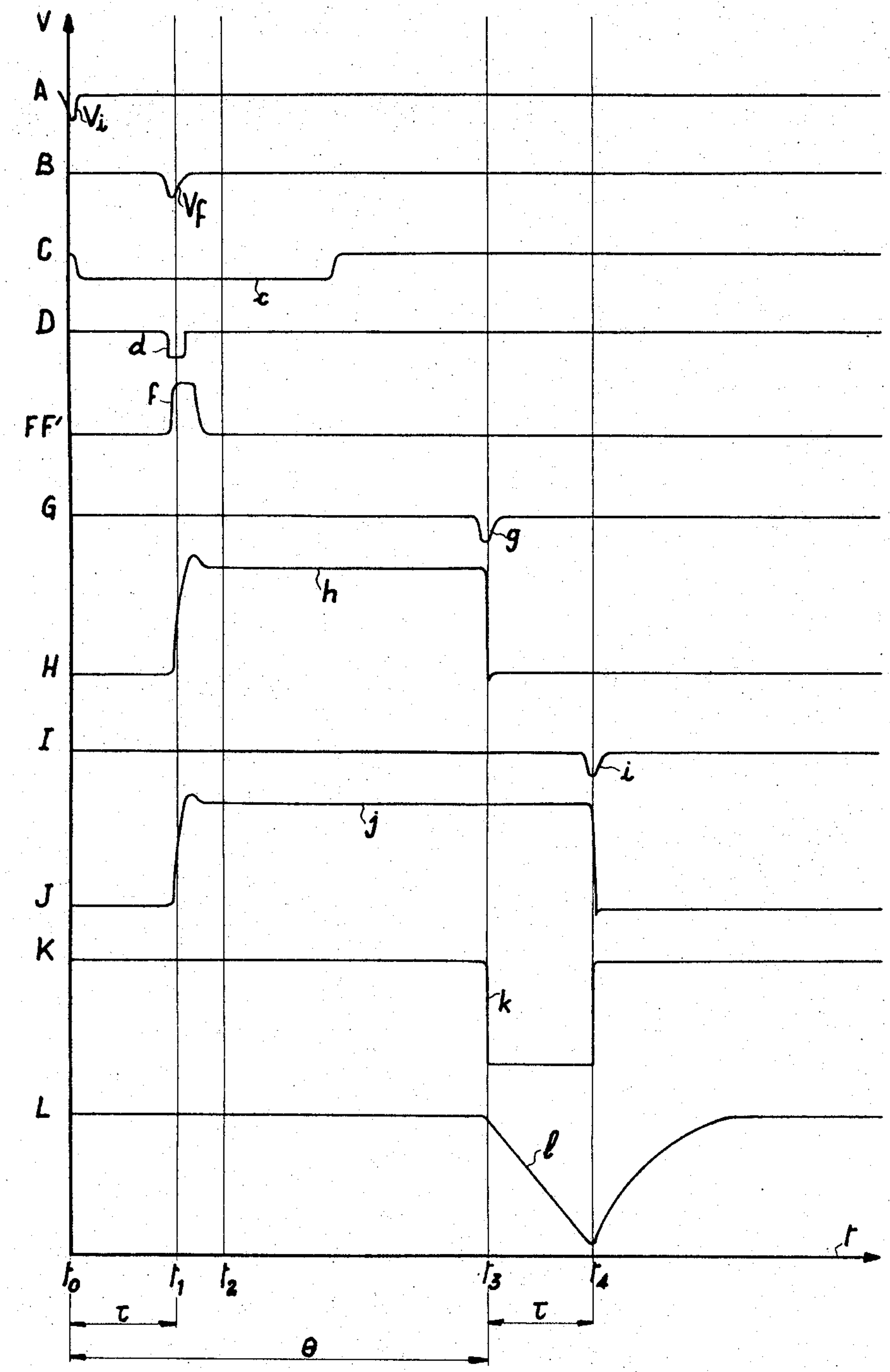

The different graphs of FIG. 4 represent the voltages which are developed at different points of the circuit of FIGS. 2 and 3, and serve to illustrate the operation of the converter.

Figure 1:
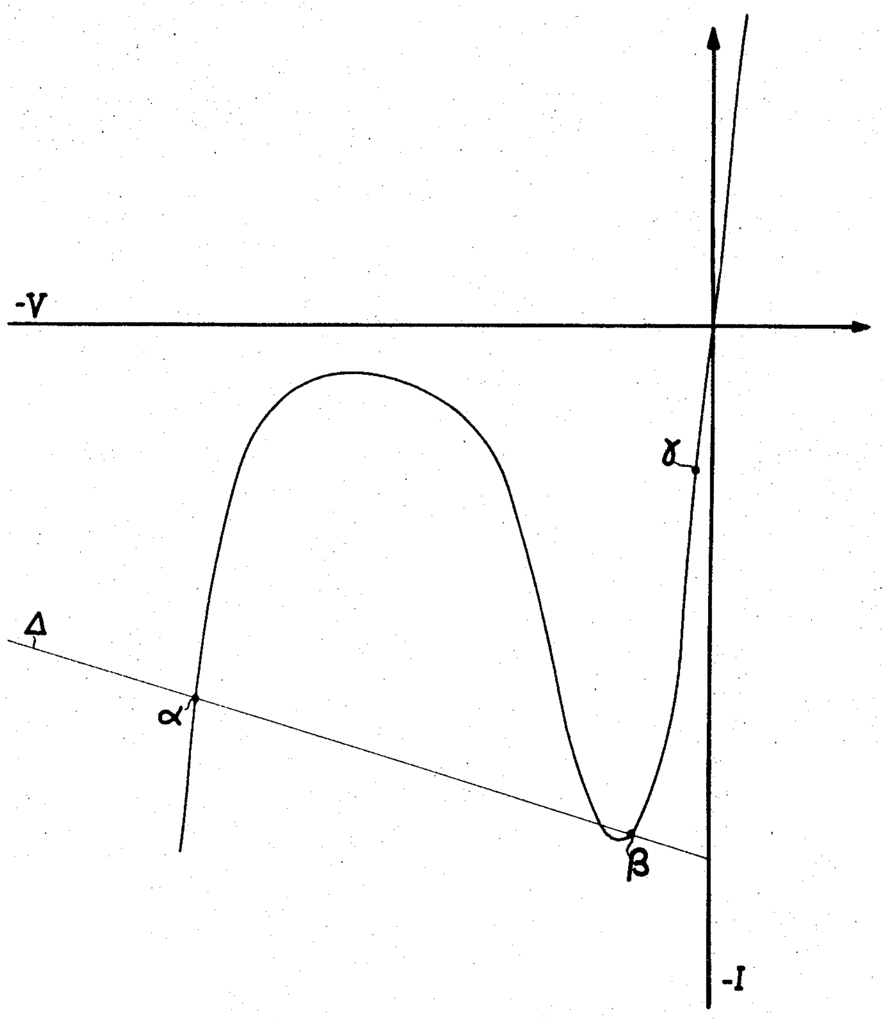
FIG. 1 represents the current/voltage curve of a tunnel doide.

Reference will first be made to a known mode of utilization of a tunnel diode of which the current/voltage characteristic is represented in FIG. 1. When at rest, the tunnel diode is polarized in such a manner that its operating point which is located on the load line $\Delta$ is stable and corresponds to the highest (in absolute value) of two possible voltages (point $\alpha$). When a tunnel diode receives a pulse having a positive polarity, its operating point changes over from $\alpha$ to $\gamma$ then moves rapidly to $\beta$ on the load line. There can thus be distinguished two main states of the diode, namely the so-called normal state (point $\alpha$) and intermediate state (point $\beta$).

In the time-amplitude converter 1 which is represented in FIG. 2, the tunnel diodes employed operate in the manner which has just been explained and are normally in the $\alpha$ state.

An initial pulse $V_i$ (time interval to $t_0$) and a final pulse $V_f$ (time intervals $t_1$, $t_1-t_0=\tau$) which are respectively applied to the inputs 2 and 3 are transmitted by two channels which each consist of two parallel lines 5–6 and 7–8. It should be noted that the pulses $V_i$ and $V_f$ are respectively represented in the lines A and B of FIG. 4.

It should be noted that, for the sake of clarity of the description in reference to the operation of the time-amplitude converter, both the curve representing a signal (FIG. 4) and the point at which the signal appears (FIG. 2) have both been designated by the same capital letters in FIGS. 4 and 2.

The two first lines of each channel 5–7 (shown in FIG. 2) serve the purpose of ascertaining that certain conditions, studied in detail later, are fulfilled by the pulses $V_i$ and $V_f$ and of effecting in this case the establishment of the intermediate state in the two tunnel diodes 10 and 11. These two lines are each constituted by an amplitude discriminator. The two amplitude discriminators are respectively coupled to the two inputs of a coincidence circuit 12 which controls a pulse generator 13 and the pulses produced by this latter have the effect of establishing the intermediate state in the two tunnel diodes.

The two second lines are respectively consitituted by two delay devices 6 and 8. Each delay device transmits to the corresponding tunnel diode 10 (or 11) one of the pulses $V_i$ (or $V_f$) with a delay $\theta$ at the instant $t_3=t_0+\theta$ or at the instant $t_4=t_1+\theta$ (lines G and I of FIG. 4).

The function of the discriminators 5–7 will now be explained. When the first discriminator receives a pulse ($V_i$) having an amplitude which is greater than the threshold of operation of said device, said discriminator produces a rectangular pulse *c* (line C, FIG. 4) having a predetermined amplitude and a duration which is equal to the longest time interval which the converter is capable of measuring. When the second amplitude discriminator (7) receives a pulse ($V_f$) having an amplitude which is greater than the threshold of operation of said discriminator, it produces a brief rectangular pulse *d* (line D, FIG. 4). When the pulses $V_i$ and $V_f$ have a sufficient amplitude and when they define a time interval which can be measured by the converter, the pulses *c* and *d* are, during the time-lapse of the second of said pulses, simultaneously present at the inputs of the coincidence circuit 12 (FIG. 2) and this latter generates a pulse which actuates the generator 13. The said pulse *f* (line F–F′, FIG. 4) then appears at the output of said generator, is applied to the tunnel diodes 10–11 (FIG. 2) which change from the state $\alpha$ at the time $t_1$ to the state $\beta$ at the time $t_2$ (lines H and J of FIG. 4). The initial pulse and final pulse $V_i$ and $V_f$ which have been delayed by the time $\theta$ are then applied to the tunnel diodes and cause the state $\alpha$ to be re-established therein. The signals *h* and *j* (lines H–J, FIG. 4) which appear in the output circuits of the tunnel diodes are rectangular pulses, the trailing edges of which are displaced by $t_4-t_3=t_1-t_0=\tau$. These pulses are applied to the controlling unit 15 (FIG. 2) at the output of which there appears a rectangular pulse *k* having a duration which is equal to the time interval which is measured (line K, FIG. 4). The pulse *k* is transmitted to the integrator 16 (FIG. 2) which produces a pulse *l* (line L, FIG. 4), the amplitude of which is proportional to the duration $\tau$ of the pulse *k*.

The elements which are represented in the circuit diagram of the time-amplitude converter of FIG. 3 as will now be described and which are similar to the elements represented in the block diagram of FIG. 2 are designated by the same reference numerals.

The amplitude discriminators 5 and 7 (FIG. 3) can be of any suitable type provided that they carry out the functions defined in reference to FIG. 2. The pulses produced by the devices 5 and 7 are applied to the diode tunnel 17 of the coincidence circuit 12 through the resistors 18, 20. The said tunnel diode, which is charged through the inductance 21 as well as through the resistor 22, is polarized from a source producing a voltage −V1 by means of the chain comprising the elements 21, 22 which have already been mentioned, by means of the potentiometer 23 and the resistor 25. When the pulses *c* and *d* (FIG. 4) coincide to a partial extent, the addition of the currents which are transmitted by the resistors 18–20 into the diode 17 triggers said diode which is mounted as a monostable device.

The triggering of the diode 17 produces a signal of negative polarity which is applied to the base of the transistor 26, the polarizing voltages of which are adjusted so that the operating point of said transistor is located in the avalanche zone. Under these conditions, when coincidence occurs, said transistor is triggered and produces a signal having positive polarity and substantial amplitude. Said signal is transmitted to the polarization chains 27–28 and 30–31 of the tunnel diodes 32 and 33 by the transistors 35 and 36 which are mounted with the bases connected to ground (earth).

The application of the pulse *f* (line FF′, FIG. 4) produced by said transistors to said polarization chains establishes the state $\beta$ in the tunnel diodes 32 and 33 (FIG. 1).

The devices 6 and 8 are in this case delay lines which are constituted by a section of coaxial cable. The pulses $V_i$ and $V_f$ which are delayed by $\theta$ are transmitted to the tunnel diodes through the resistors 37–38. The pulses *h* and *j* (FIG. 4) which are produced by said diodes are applied to the windings 40–41 of the transformer which constitutes the controller 15 through the resistors 42–43. The said transformer mixes the pulses *h–j* (FIG. 4), the polarity of the pulse *j* being reversed.

The pulse which is produced by the controller has the duration $\tau$ of the time interval which is measured and is applied to the emitter of the transistor 44 which forms part of the integrator 15 in which the time-amplitude conversion proper takes place. The essential elements of this device are the integration capacitance 49 as well as the resistors 45 and 46. The transistor 44, the base of which is polarized at a fixed voltage from a source producing a voltage +V5, from a variable resistor 47 and from a diode 48 which is decoupled by the capacitor 50, is normally blocked. The pulse *k* (FIG. 4) which is applied to the emitter of said transistor makes this latter conductive during the period $\tau$, the current delivered being predetermined. This latter is integrated by the elements 49–45–46. There appears at the common point of said elements a pulse *l* (line L, FIG. 4), the amplitude of which is proportional to the period $\tau$ and which can be transmitted through the resistor 51 to an amplifier 52, not shown.

The apparatus which has just been described has been constructed by the present applicant and employed for the purpose of measuring the transit time of fast neutrons having energies of 14 mev. The resolving time was 1.25 nsecs., the neutron detector having an energy threshold value equal to 2 mev. The differential linearity was of the order of 5% and the maximum sensitivity of the converter was approximately 0.5 v.

What I claim is:

1. A time-amplitude converter for producing an output signal having an amplitude proportional to a time interval defined by an initial pulse and a final pulse comprising:
   - a first pulse discriminator adapted to receive said initial pulse and produce in response thereto an output having a time duration equal to the maximum interval to be measured,
   - a second pulse discriminator adapted to receive said final pulse and produce in response thereto an output of short duration,
   - pulse generator means for producing a pulse in response to coincident outputs of said pulse discriminators,
   - a first and a second negative resistance diode arranged in parallel between ground and a source normally biasing said diodes to a first stable operating state,
   - first circuit means for applying the pulse generator means output pulse to bias said negative resistance diodes to a second operating state, subtractor means for combining in opposition the output voltages of said negative resistance diodes while in said second state, second circuit means for delaying said initial pulse for a predetermined time interval and applying it to restore said first negative resistance diode to the first stable operating state, third circuit means for delaying said final pulse for said predetermined time interval and applying it to restore said second negative resistance diode to the first stable operating state, means connected to said subtractor means to integrate the combined negative resistance diode output voltages and produce a pulse having an amplitude proportional to the time period that said second negative resistance diode remains in its second operating state after said first negative resistance diode has been restored to its first operating state.

2. A time-amplitude converter as described in claim 1 wherein said pulse generator means includes a coincidence circuit adapted to receive the respective outputs from said pulse discriminators, and a pulse generator connected to said coincidence circuit.

3. A time-amplitude converter as described in claim 2 wherein said subtractor means is comprised of a pulse transformer having two windings wound in bucking relationship, first ends of each winding being connected to ground and second ends being respectively connected to receive the outputs of said first and second negative resistance diodes.

References Cited

UNITED STATES PATENTS

| | | | |
|---|---|---|---|
| 3,021,481 | 2/1962 | Kalmus et al. | 324—83 |
| 3,133,206 | 5/1964 | Bergman et al. | 307—88.5 |
| 3,205,376 | 9/1964 | Berry et al. | 307—88.5 |
| 3,211,993 | 10/1965 | Golden et al. | 324—83 |
| 3,250,990 | 5/1966 | Hubbs et al. | 324—68 |

RUDOLPH V. ROLINEC, *Primary Examiner.*

WALTER L. CARLSON, *Examiner.*

P. F. WILLE, *Assistant Examiner.*